(12) United States Patent
Voerman et al.

(10) Patent No.: US 6,609,728 B1
(45) Date of Patent: Aug. 26, 2003

(54) IDENTIFICATION MARK COMPRISING AN OPTICALLY AND ELECTRONICALLY READABLE MARKING

(75) Inventors: Roelof Voerman, Middelburg (NL); Bob Snoeck, Krimpen Aan de Ijssel (NL)

(73) Assignee: Security Graphics B.V., Rotterdam (NL)

( * ) Notice: Subject to any disclaimer, the term of this patent is extended or adjusted under 35 U.S.C. 154(b) by 0 days.

(21) Appl. No.: 09/623,561

(22) PCT Filed: Mar. 8, 1999

(86) PCT No.: PCT/NL99/00123
§ 371 (c)(1),
(2), (4) Date: Jan. 17, 2001

(87) PCT Pub. No.: WO99/45513
PCT Pub. Date: Sep. 10, 1999

(Under 37 CFR 1.47)

(30) Foreign Application Priority Data

Mar. 6, 1998 (NL) ............................................. 1008519

(51) Int. Cl.[7] ................................................ B42D 15/00
(52) U.S. Cl. ............................. 283/70; 283/72; 283/83; 283/86; 283/91; 705/1
(58) Field of Search ............................... 283/81, 72, 74, 283/82, 83, 86, 91, 92, 93, 94; 705/1; 235/375, 380; 340/572.1

(56) References Cited

U.S. PATENT DOCUMENTS

| | | | | |
|---|---|---|---|---|
| 5,762,377 A | * | 6/1998 | Chamberlain | ................ 283/94 |
| 6,031,457 A | * | 2/2000 | Bonkowski et al. | .......... 283/83 |
| 6,226,619 B1 | * | 5/2001 | Halperin et al. | ................ 705/1 |
| 6,254,139 B1 | * | 7/2001 | Fresnel | ........................ 283/72 |

FOREIGN PATENT DOCUMENTS

| | | |
|---|---|---|
| DE | 43 23 883 | 1/1995 |
| EP | 0 408 896 | 1/1991 |
| EP | 0 673 853 | 9/1995 |
| FR | 2 704 964 | 11/1994 |

* cited by examiner

*Primary Examiner*—Willmon Fridie, Jr.
(74) *Attorney, Agent, or Firm*—Young & Thompson

(57) ABSTRACT

Authenticity/security identification consists of an optical marking and an (acoustic/electro)magnetic marking. The optical marking can comprise a hologram. The two identification marks are produced as a single entity during the production in a number of immediately successive steps. During this process a layer of soft magnetic material is provided with an additional layer of metal which contains the hologram.

11 Claims, 2 Drawing Sheets

IDENTIFICATION MARK COMPRISING AN OPTICALLY AND ELECTRONICALLY READABLE MARKING

CROSS REFERENCE TO RELATED APPLICATION

This is the 35 USC 371 national stage of international application PCT/NL99/00123 filed on Mar. 8, 1999 which designated the United States of America.

FIELD OF THE INVENTION

The present invention relates to an identification mark comprising an optically and an electronically readable marking. The electronic marking comprises an (acoustic/electro) magnetic marking, having a soft magnetic layer, and the optical marking comprises a structure provided with a relief.

BACKGROUND OF THE INVENTION

An identification mark of this type is disclosed in European Patent Application 0 673 853. This publication describes a security marking. A security marking is a marking which reacts to an acoustic, electrical or (electro) magnetic signal which if it is not deactivated, for example taken past an antenna in a shop without being paid for, can cause a signal to be triggered. A security marking of this type is provided with screening that can be deactivated. If it is handled correctly, that is to say deactivated, the effect of the soft magnetic layer used in the security marking can be negated by deactivating it. The optical marking described in European Application 0 673 853 comprises a hologram. Purchasers can see from this hologram whether a product is a genuine brand product or an imitation. According to what is described in the said European Application, the hologram is fixed to the authenticity marking by means of an adhesive. This joining technique, that is to say the use of adhesive, is relatively complex in the case of large-scale production and increases the cost price, but, on the other hand is attractive to imitators. After all, ever increasing numbers of forged holograms are coming onto the market, whilst authenticity markings are likewise being forged.

SUMMARY OF THE INVENTION

The aim of the present invention is to provide an improved identification mark which, on the one hand, is less expensive and can be produced more accurately in large runs but, on the other hand, is more difficult to copy.

This aim is achieved with an identification mark as described above, and which comprises an authenticity marking provided in the electronically readable marking. The soft magnetic layer has a thickness of less than 1 μm, and an additional metallic layer, which contains the optically readable marking. According to the invention, the hologram or other optical marking is joined to the (acoustic/electro) magnetic marking during the production process itself. By this means an efficient and accurate production process can be provided whilst copying is made more difficult. After all, the identification mark obtained according to the invention no longer consists of the simple combination of a hologram and authenticity marking. In contrast to the European Application 0 673 853 described above, there is no adhesive layer between the hologram component and the (acoustic/electro) magnetic component.

It is possible to deposit the additional metallic layer directly on the soft magnetic layer. According to another embodiment, it is possible to insert an intermediate layer, such as a carrier layer consisting of PET, OPP or PVC. The same applies with regard to the optical marking. The latter can either be incorporated directly in the additional metallic layer, but also in a coating applied thereon. The optical marking is preferably a hologram. Holograms are also understood to include kinegrams, pixelgrams, kineforms and the like. These can be either two-dimensional or three-dimensional. Holograms are also understood to include 'Optical Variable Devices' ('OVD'), that is to say devices which are optically readable, for example with the aid of a scanner. Pixel comparison is likewise possible. A hologram can be applied in any way known in the sate of the art. Embossing is one possibility and this is used in particular if the hologram is applied in the additional metallic layer. This additional metallic layer can comprise any material known in the art and according to a preferred embodiment consists of aluminium.

The (acoustic/electro)magnetic marking described above can be either an authenticity marking or a security marking. The hologram described above is an authenticity marking. The combination described above of a soft magnetic layer and a (hard) magnetic layer that can be deactivated is a security marking. However, it is possible for the marking according to the invention to be implemented solely as an authenticity marking, that is to say for only a soft magnetic layer to be present which cannot be deactivated in any way whatsoever. So as not to trip existing security devices in such a case, it can be necessary to reduce the effectiveness of such a soft magnetic layer, for example by reducing the thickness thereof. Whereas in the prior art and in the invention the layer thickness of a soft magnetic layer for a security marking is approximately 1 μm, when said marking is used as an authenticity marking said layer thickness will be considerably less than 1 μm and in a preferred embodiment less than 0.5 μm. With the aid of such an (electro) magnetic authenticity marking it is possible to detect markings which are inside packaging, that is to say in situations where the hologram is not visible, with the aid of relatively simple equipment. Moreover, it is possible to give different products different (electro)magnetic characteristics which are characteristic of the products concerned. For instance, the composition of the soft magnetic layer can consist of various quantities and combinations of soft ferrous and non-ferrous metals, such as copper, cobalt, silver and gold. Likewise, a difference in relief, coarser or finer, in the metallic layer and/or the magnetic layer can be produced by using different embossing (hologram, etc.), by means of which the nature of the (electro)magnetic signal is influenced.

By means of different combinations it is possible to recognise and distinguish different types of products. It is possible to recognise different products from a distance of, for example, 5 cm using relatively simple equipment.

As indicated above, the identification mark can be implemented either as a security marking or as an authenticity marking. It is possible to attach the identification mark according to the invention to packaging, but also to attach it to documents to guarantee the authenticity thereof. The fixing technique can be any technique known in the state of the art, such as sticking. According to an advantageous embodiment of the invention, said fixing technique also comprises the hot stamp technique. With the latter technique fusion takes place between the material to which the identification mark has been applied and that layer of the identification mark which adjoins said material. As a result it is not possible to remove the identification mark without damaging the packaging and/or document concerned. This offers appreciable security.

It will be understood that the abovementioned layers of the identification mark are only those layers which are essential to the invention. Depending on the application and the production method, numerous further layers can be present, as will also be seen from the illustrative embodiments described with reference to the drawings.

The deposition technique described above for the additional metallic layer, such as an aluminium layer, can comprise any deposition technique known in the state of the art. In this context consideration is given to the vacuum deposition technique, but also to sputtering techniques.

It is possible to make the identification mark according to the invention in any shape. For instance, for use on a compact disc the identification mark could be produced in the form of a ring which extends around the central opening. This ring can then be applied either with the aid of an adhesive auxiliary layer or by using the hot stamp technique described above. In the case of use on a compact disc, the identification mark can be either an authenticity marking or a security marking.

The present invention also relates to a method for the production of the identification mark described above. With this method the optical marking and the (acoustic/electro) magnetic marking are produced in an unbroken sequence of steps as a single identification mark. That is to say, preferably, after provision of a layer of material having soft magnetic properties, a further metallic layer is applied thereon with the aid of a deposition technique, in which further layer the hologram is then produced. As indicated above, an auxiliary layer, for example composed of plastic material, can have been applied between the soft magnetic layer and the additional layer, which preferably consists of aluminium. Moreover, the additional layer can have been provided with a (plastic) coating in which the hologram is then produced. That is to say, in contrast to the prior art, it is not the case that, on the one hand, an (acoustic/electro) magnetic marking and optical marking are provided in two completely separate steps and these two layers are then joined to one another in a third step, but the hologram or any other optical identification mark is produced in a step integrated in the process in a layer which has already been joined to the soft magnetic layer.

BRIEF DESCRIPTION OF THE DRAWINGS

The invention will be explained in more detail below with reference to illustrative embodiments shown in the drawings. The drawings all refer to an authenticity marking, but it must be understood that the invention also extends to the field of security markings. In the drawings.

DETAILED DESCRIPTION OF THE INVENTION

Figure 1:
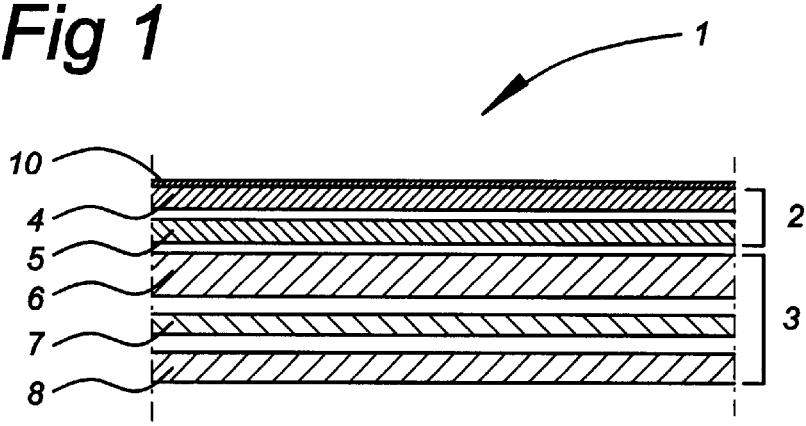
FIG. 1 shows, in cross-section, one embodiment of the authenticity identification mark according to the invention.

The authenticity marking according to the invention is indicated in its entirety by 1. The end edges have been shown broken away to indicate that component 1 can have any imaginable shape. This authenticity marking according to the invention consists of a component 2 that has been produced as a hologram or optical authenticity marking and a component 3 in which a magnetisable layer is located. A hologram, as described above, or optical security marking is described in Netherlands Patent Application 9001616. In the embodiment according to FIG. 1, component 2 consists, from the outside to the inside, of a transparent varnish layer 10, a coating 4 with holographic information incorporated therein, in contact with which there is an aluminium layer 5 which has been produced by vapour deposition on carrier layer 6, which in this embodiment comprises a PET layer. A magnetisable layer, such as an Atalante® layer 7, which is provided with an adhesive layer 8 for fixing to the article concerned, adjoins this PET layer.

It is possible to produce authenticity marking 1 in any way imaginable in the state of the art. One possibility is to first produce component 3, after which aluminium layer 5 is vapour-deposited on the PET layer 6, the layers 4 and 10 then being applied.

The various layers can have thicknesses which are suitable for the associated function.

For instance, layer 7 can have a thickness of between 0.1 and 0.5 $\mu$m and more particularly 0.1–0.5 $\mu$m. Layer 4 can have a thickness of approximately 1.0 $\mu$m. A thickness of approximately 23 $\mu$m may be mentioned for layer 6.

Instead of attaching layer 6 by adhesive, other joining techniques, such as laminating and the like, are also possible.

It will be understood that there are equivalents for the various layers. For instance, layer 6 can be replaced by a (biaxially orientated) polypropylene or PVC layer.

Those skilled in the art will also understand that component 3 can be replaced by a component reacting to a radio frequency field or by a component reacting to an acoustic-magnetic or electromagnetic field. Adhesion to the authenticity marking 2 will be achieved depending on the component concerned.

Figure 2:
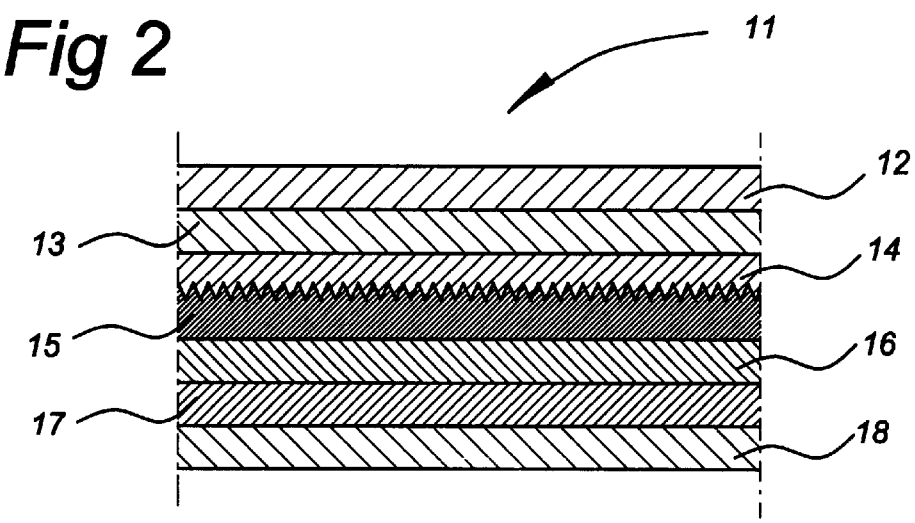
FIG. 2 shows a variant of the construction shown in FIG. 1, shown as hot stamping film for hot stamping.

FIG. 2 shows a film that can be processed by the hot stamp technique and is indicated in its entirety by 11. This film consists of a polyester layer 12, a release layer 13, a varnish layer 14 in which a hologram has been produced with the aid of a relief technique, an aluminium layer 15 applied using a vacuum technique, an additional soft magnetic aluminium layer 16 of relatively small thickness, applied by a sputtering technique, an adhesive layer 17 and a cover layer protecting said adhesive layer.

Figure 3:
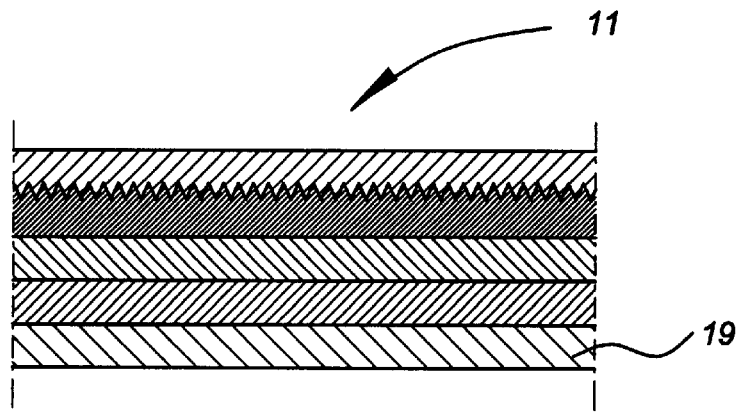
FIG. 3 shows the construction according to FIG. 2 after hot stamping.

FIG. 3 shows the film 11 after the use of heat and pressure (hot stamp technique). Moreover, the layers 12 and 13 have been removed and the film 11 has been applied to a substrate by removing cover layer 18 and applying a substrate 19.

Figure 4:
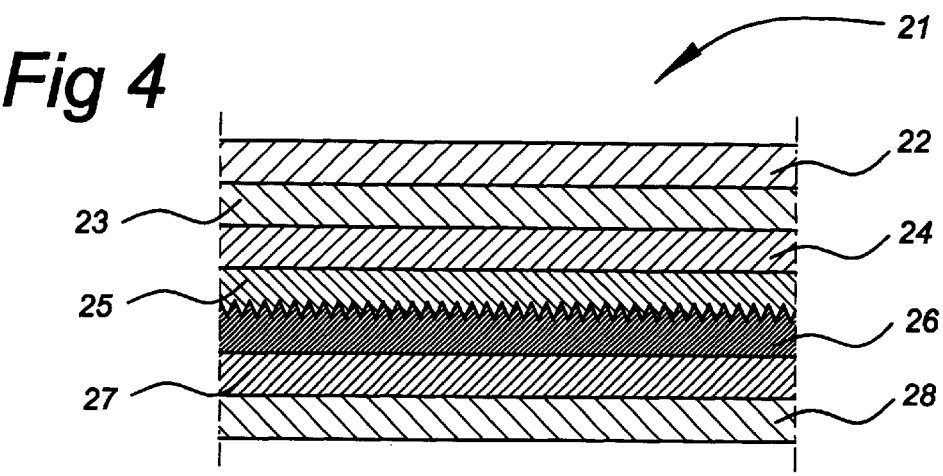
FIG. 4 shows a further film layer that can be processed by the hot stamp technique.
Figure 5:
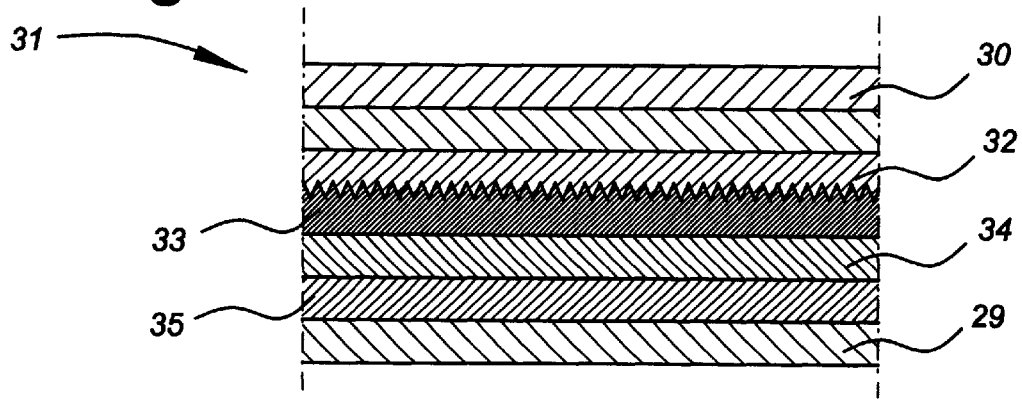
FIG. 5 shows laminate using the hot stamp technique.

FIG. 4 shows a further variant in which the film layer is indicated in its entirety by 21. The polyester layer is indicated by 22 and the underlying release layer by 23. In contrast to the embodiment according to FIG. 2, the hologram is applied in the aliminium layer indicated by 25, which aluminium layer has been deposited by a vacuum technique, the hologram facing layer 24 having a relatively small thickness (for example 2 Å). Beneath layer 25 there is once again an additional sputtered soft magnetic layer 26, a layer of adhesive 27 and a cover layer 28. FIG. 5 shows how a film 21 is placed between two components of a credit card, which are indicated by 29 and 30. The film is indicated in its entirety by 31 and consists of a hot-melt adhesive layer 32, a relatively thick deposited aluminium layer 33, into which a hologram has been introduced, and a further soft magnetic layer 34, applied by sputtering, and an adhesive layer 35.

Figure 6:
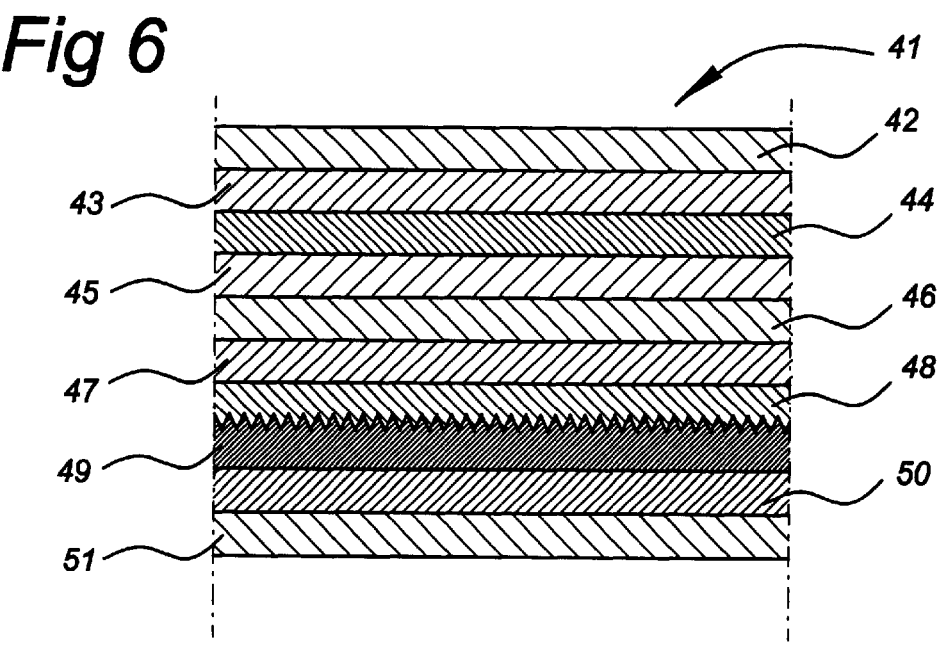
FIG. 6 shows a further construction in which a paper layer is used as support.

In FIG. 6 a variant of the invention is indicated in its entirety by 41. This variant is protected by a paper support layer 42 onto which an adhesive 43 has been applied. A polyester layer is indicated by 44, on which polyester layer a release layer 45 has been applied. 46 indicates a soft magnetic layer applied with the aid of a sputtering technique. An aluminium metallic layer 47, a varnish layer 48 and a layer 49 containing a hologram have then been applied. An aluminium metallised layer 50 and a sealing layer 51 then follow. The sealing layer 51 can comprise a wax covering.

Several of the layers shown in FIG. 6 can be dispensed with or replaced by other layers. For instance, it is possible to apply the hologram in a varnish layer, such as a UV varnish layer. It will be understood that numerous variants are possible which fall within the scope of the present invention but always result in the combination of a hologram with an electronic authenticity marking.

Furthermore, it is possible to combine the authenticity marking according to the invention with, for example, a barcode. Such a barcode can be present on the film layer and can be applied, for example, using very fine etching techniques.

It will be clear to those skilled in the art that many variants are possible and that the fields of application are likewise diverse. These various aspects fall within the scope of the appended claims.

What is claimed is:

1. An identification mark that is both optically readable and electronically readable, the identification mark comprising:

an electronically readable marking incorporating an authenticity marking, the electronically readable marking comprising a soft magnetic layer having a thickness of less than 1 μm, the electronic marking being configured to operate as one of an acoustic-magnetic and electromagnetic electronic marking; and an optically readable marking conjoined with the electronic marking, the optically readable marking comprising a metallic layer deposited on said soft magnetic layer of the electronically readable marking, the optically readable marking comprising a structure provided with a relief.

2. A method of producing an identification mark that is both optically readable and electronically readable, comprising the steps of:

providing an electronically readable marking incorporating an authenticity marking, the electronically readable marking comprising a soft magnetic layer having a thickness of less than 1 μm, the electronic marking being configured to operate as one of an acoustic-magnetic and electromagnetic electronic marking; and joining an optically readable marking with the electronically readable marking, the optically readable marking comprising a layer comprising a relief, the layer comprising the relief being joined to the soft magnetic layer of the electronically readable marking.

3. Identification mark according to claim 1, further comprising an auxiliary layer between said soft magnetic layer and said deposited metallic layer.

4. Identification mark according to claim 1, wherein said metallic layer comprises a coating in which a hologram has been produced.

5. Identification mark according to claim 1, wherein a hologram has been embossed in said metallic layer.

6. Identification mark according to claim 1, wherein said soft magnetic layer is permanently in contact with the environment without magnetic screening.

7. Identification mark according to claim 1, wherein said deposited layer is an aluminum layer.

8. Identification mark according to claim 1, wherein said soft magnetic layer comprises cobalt.

9. A product comprising the identification mark according to claim 1, said identification mark is attached to said product by hot stamp.

10. Method according to claim 2, wherein said layer in which said relief is produced is first joined to said soft magnetic layer, after which the optically readable marking is produced in said layer.

11. Method according to claim 2, comprising the further step of depositing a metallic layer on said soft magnetic layer, the optical marking being produced in said metallic layer.

* * * * *